Figure 1:
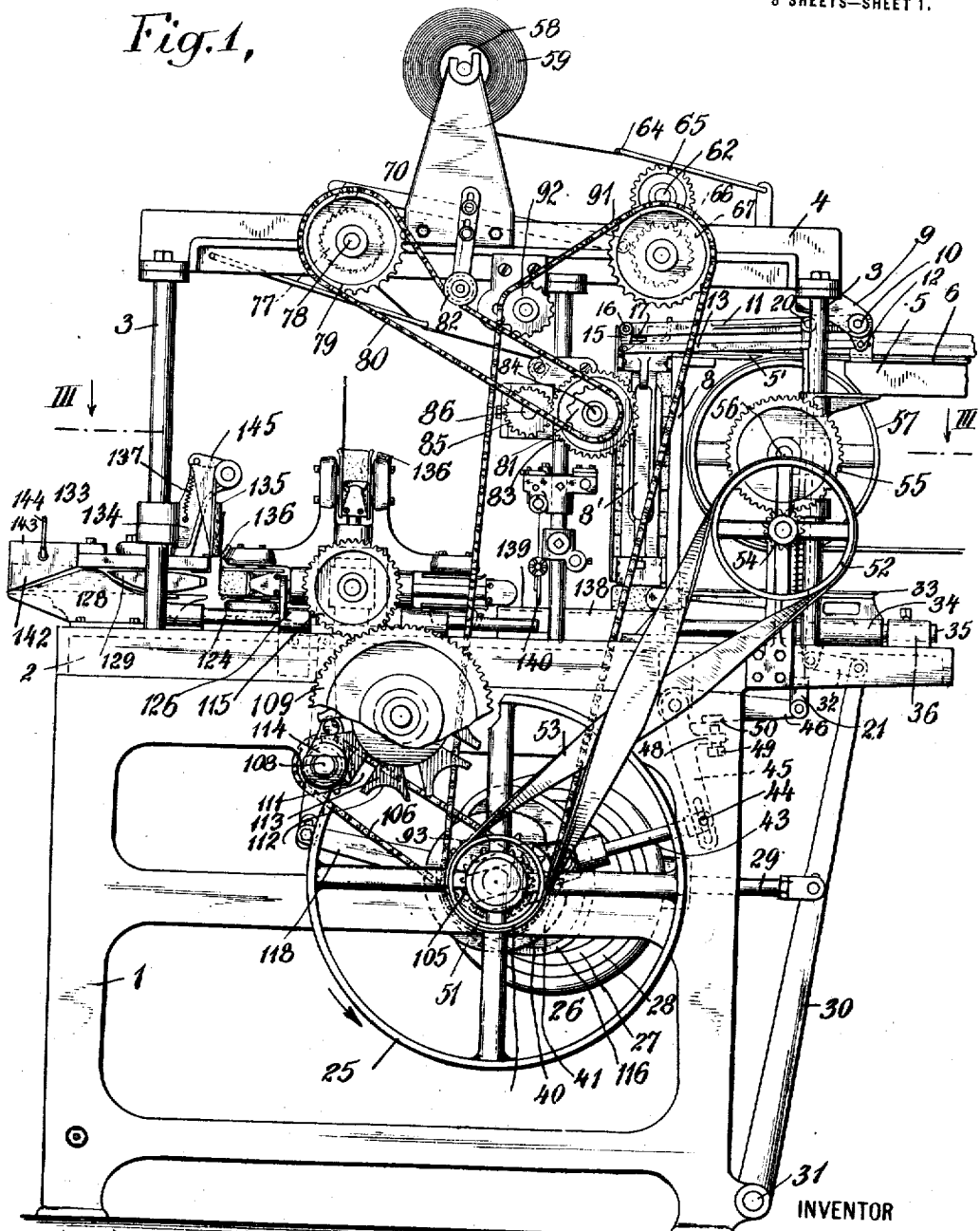

M. B. FERGUSON.
WRAPPING AND SEALING MACHINE.
APPLICATION FILED FEB. 9, 1911.

1,187,055.

Patented June 13, 1916.
8 SHEETS—SHEET 1.

WITNESSES:

INVENTOR
M. B. Ferguson
BY
Kerr Page Cooper & Hayward
ATTORNEYS

M. B. FERGUSON.
WRAPPING AND SEALING MACHINE.
APPLICATION FILED FEB. 9, 1911.

1,187,055.

Patented June 13, 1916.
8 SHEETS—SHEET 2.

WITNESSES:
Wm Bohleber
Bert R. Sandman

INVENTOR
M. B. Ferguson
BY
Page Cooper & Hayward
ATTORNEYS

M. B. FERGUSON.
WRAPPING AND SEALING MACHINE.
APPLICATION FILED FEB. 9, 1911.
1,187,055.
Patented June 13, 1916.
8 SHEETS—SHEET 3.
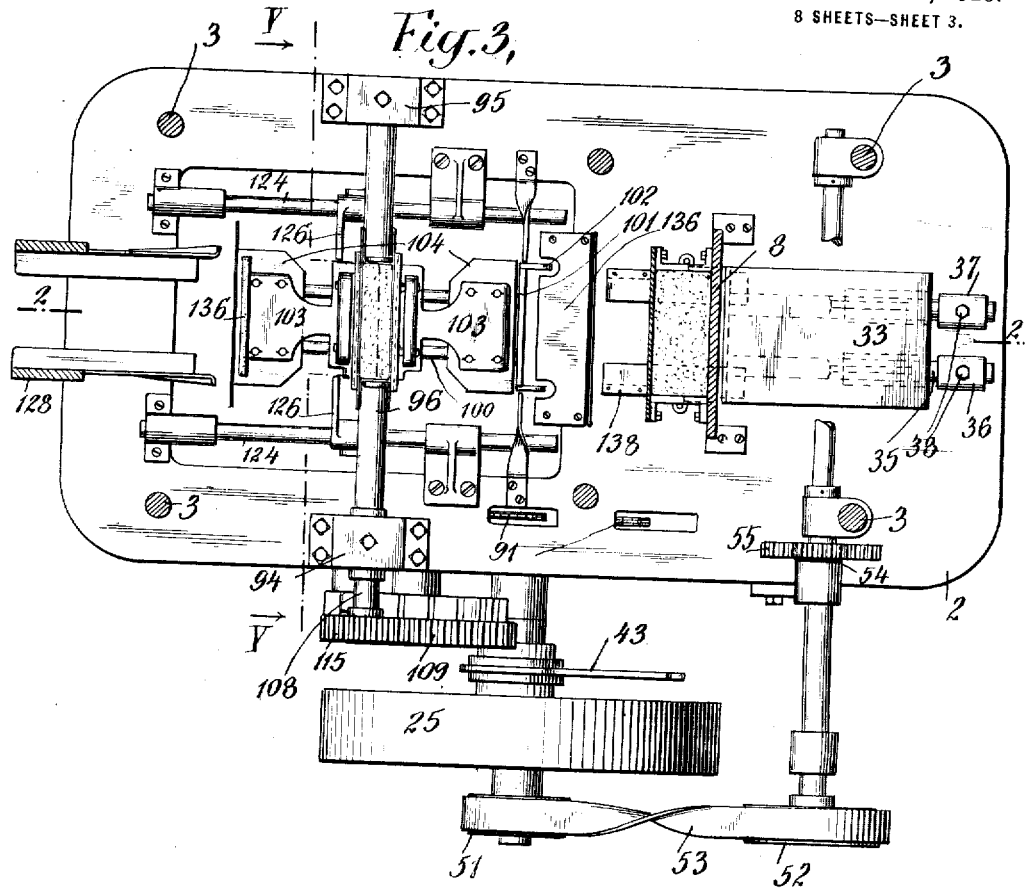
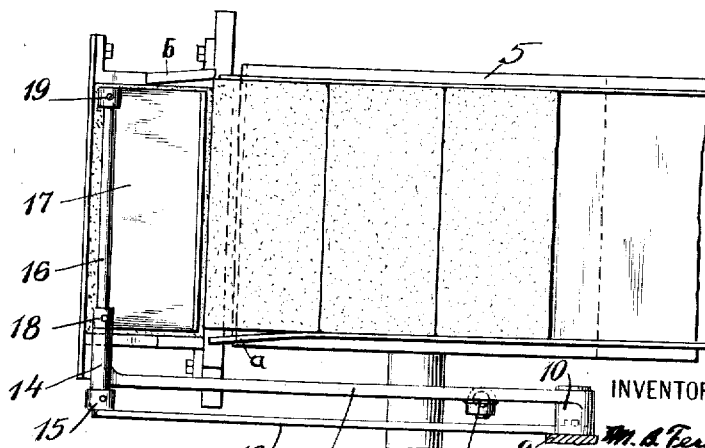

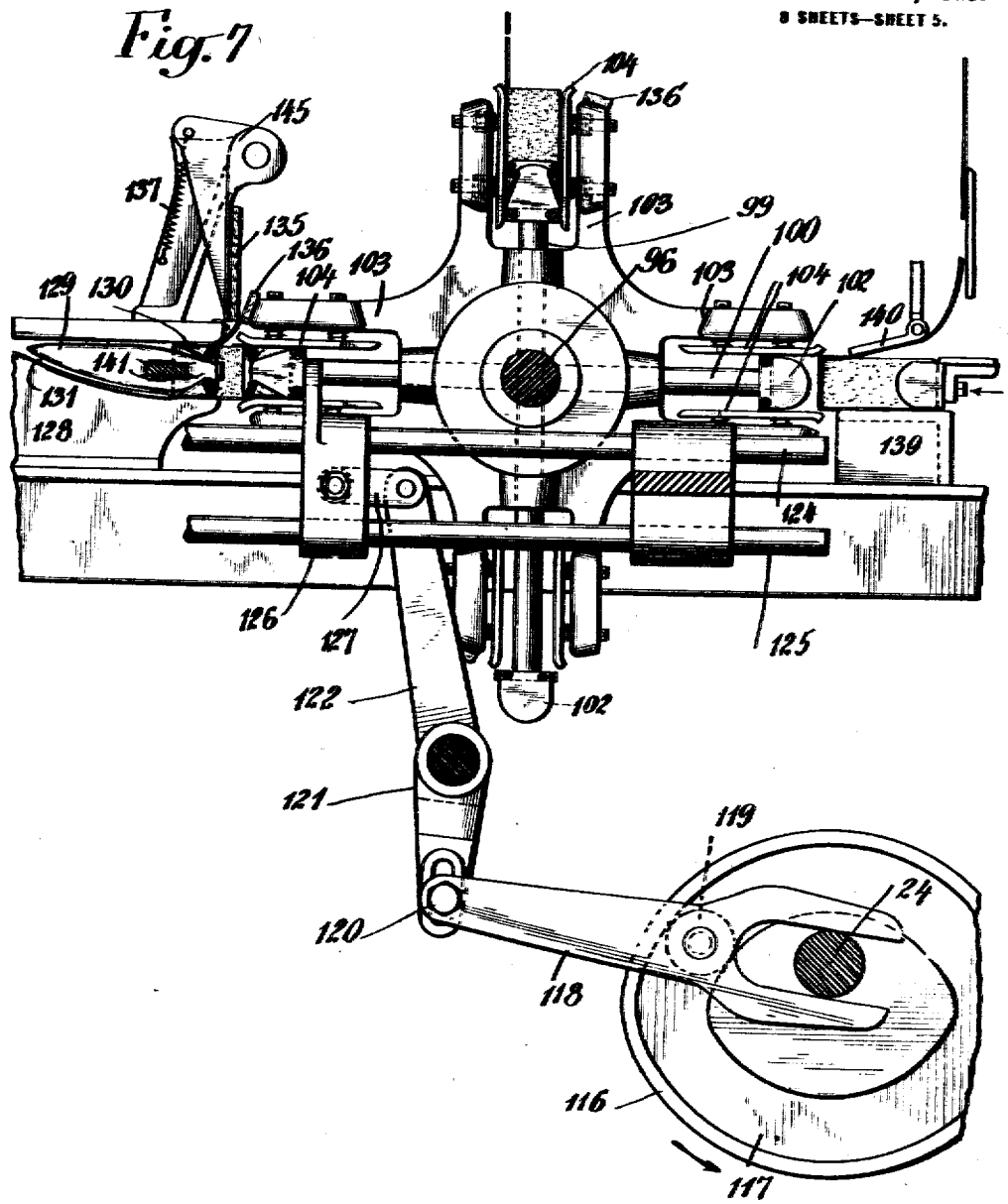

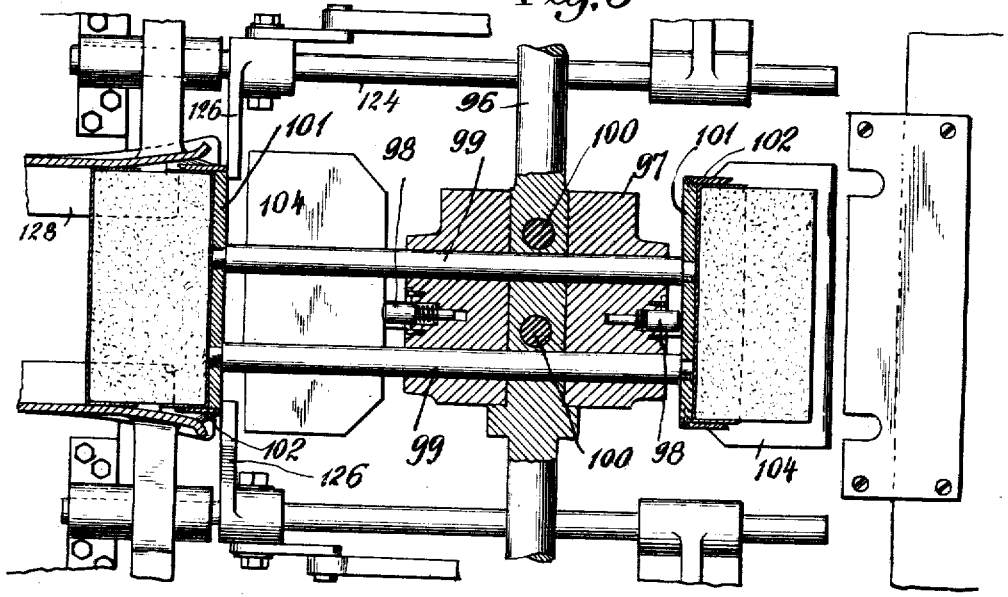
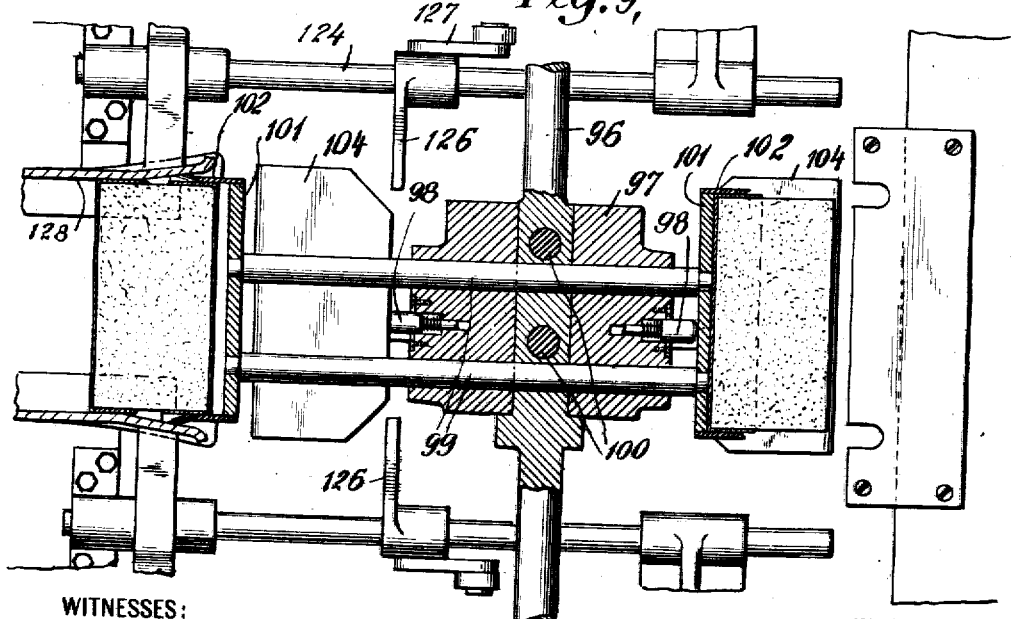

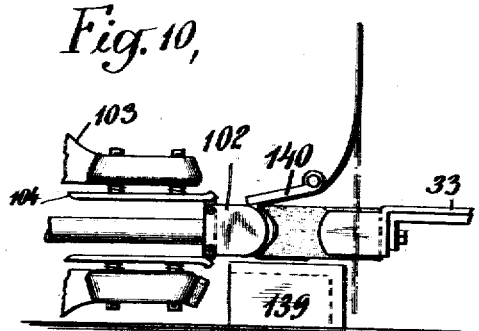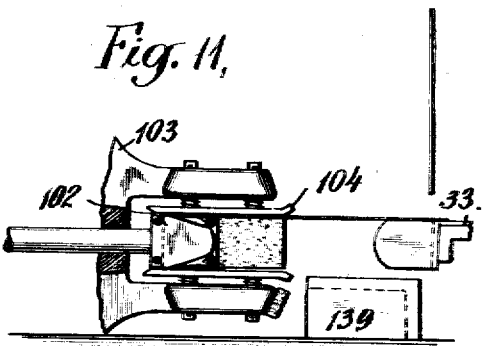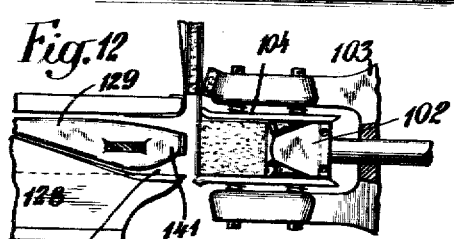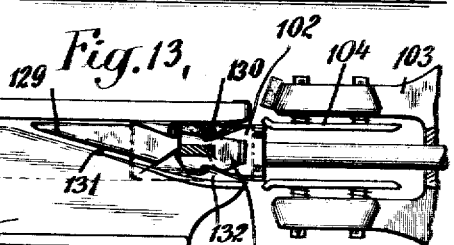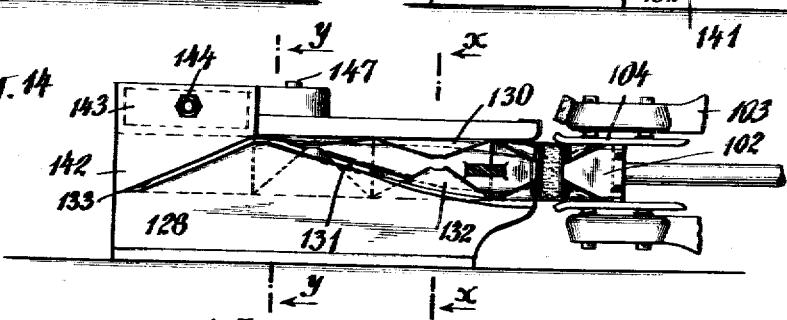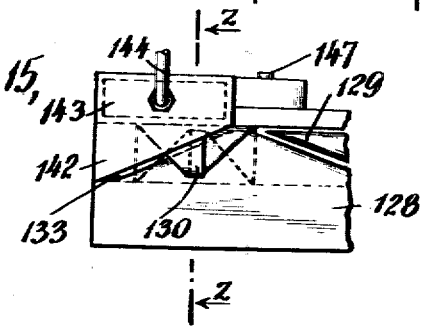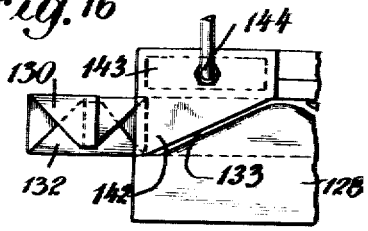

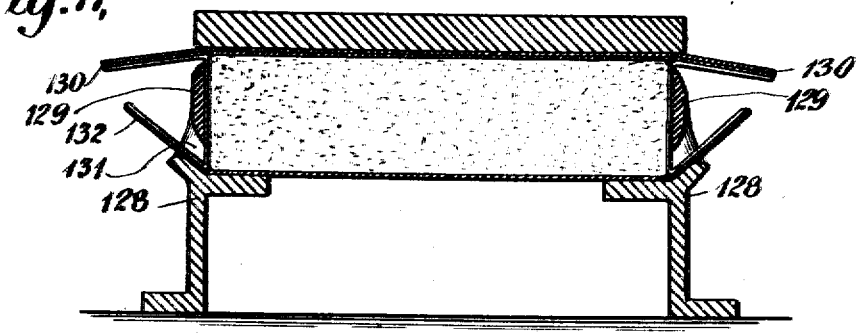
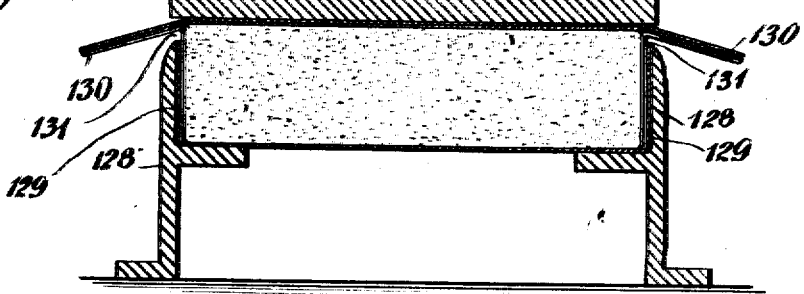
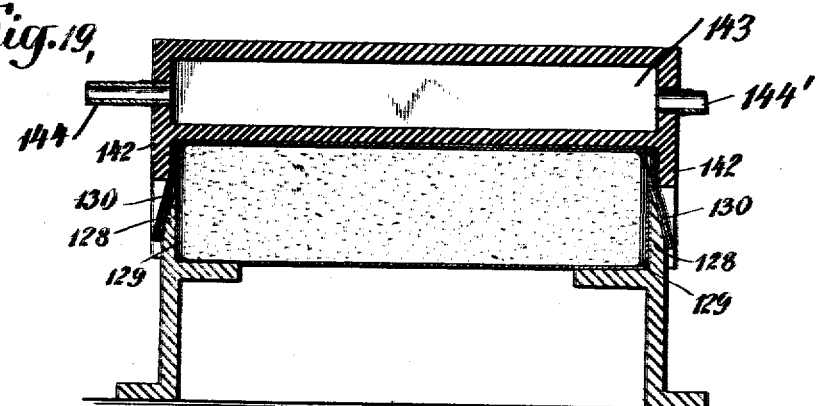

UNITED STATES PATENT OFFICE.

MILFORD B. FERGUSON, OF BROOKLYN, NEW YORK, ASSIGNOR, BY MESNE ASSIGNMENTS, TO PACKAGE MACHINERY COMPANY, OF SPRINGFIELD, MASSACHUSETTS, A CORPORATION OF MASSACHUSETTS.

WRAPPING AND SEALING MACHINE.

1,187,055.   Specification of Letters Patent.   Patented June 13, 1916.

Application filed February 9, 1911.  Serial No. 607,592.

*To all whom it may concern:*

Be it known that I, MILFORD B. FERGUSON, a citizen of the United States, residing at Brooklyn, county of Kings, and State of New York, have invented certain new and useful Improvements in Wrapping and Sealing Machines, of which the following is a full, clear, and exact description.

This invention relates to wrapping and sealing machines for wrapping and sealing articles to exclude moisture, dust, etc. For such purpose articles are wrapped in paper or similar fabric impregnated with a readily fusible substance which is impervious to moisture, such as paraffin, and the flaps or overlapping parts of the wrapper are then sealed together by the application of heat and pressure. This application melts the wax and causes the overlapping parts to adhere, so that the wrapper is effectually sealed and the contents thereof thereby protected from dampness.

The object of this invention is to provide a simple and effective apparatus for performing the wrapping operation and for applying the necessary heat and pressure to the wrapped articles to effectually seal the same.

To this and other ends the invention consists in the novel features of constructions and combinations of elements hereinafter described and more particularly set forth in the claims.

In carrying out the invention in the preferred manner I provide a suitable conveyer for delivering the articles to be wrapped to the wrapping machine which consists preferably of a conveyer belt passing over a suitable platform or support and pulleys said platform having sides thereon the width between said sides being substantially equal to the length of the articles to be wrapped. The article then passes from the conveyer to a package chute whose width and horizontal length are substantially equal to the width and length respectively of the package. This chute is adapted to receive a number of packages and should the conveyer feed them to the machine at a rate faster than the wrapping can take place no deleterious effects result, as I provide means for preventing too many packages from entering the chute and also to accurately position the packages therein.

From the lower part of the chute the package is pushed forwardly on a suitable slide by means of a suitable pushing device to a tumble box.

Located between the pusher and the tumble box and above both is a means for feeding the wrapping paper in front of the article to be wrapped. As the article passes from the pusher to the tumble box it carries the wrapping paper before it, the paper being fed from a roll located at the top of the machine and suitable means being provided between the roll and the pusher and tumble box for cutting the wrapper into suitable lengths. The tumble box has means thereon for pressing a side portion of the projecting paper toward the article. This element not only serves the function just mentioned but serves in combination with other elements to grip the package and transfer the same to a point diametrically opposite to the point at which it receives the package the tumble box being mounted on a shaft and describing an arc of a circle with the shaft as the center thereof. In describing this arc which is a semi-circle the third side of the package is covered with the wrapping paper during the transfer of the package through this semi-circle, it being understood that part of the first side, the second side and the third side are covered in transferring the package from the package chute to the tumble box. From the tumble box the package is transferred to a means for pressing and overlapping the projecting ends of the paper after which the same passes under a sealing device and the flaps are sealed thereby. In this way the article is neatly wrapped and hermetically sealed in a moisture proof wrapper which effectually excludes dampness, dust and other impurities and preserves the contents in a clean and sanitary condition.

As a matter of convenience I will refer to the "front" of the machine and the "rear" of the machine. It is to be understood therefore that the end of the machine to which the packages are fed is the front and the place where they issue will be termed the rear.

Figure 2:
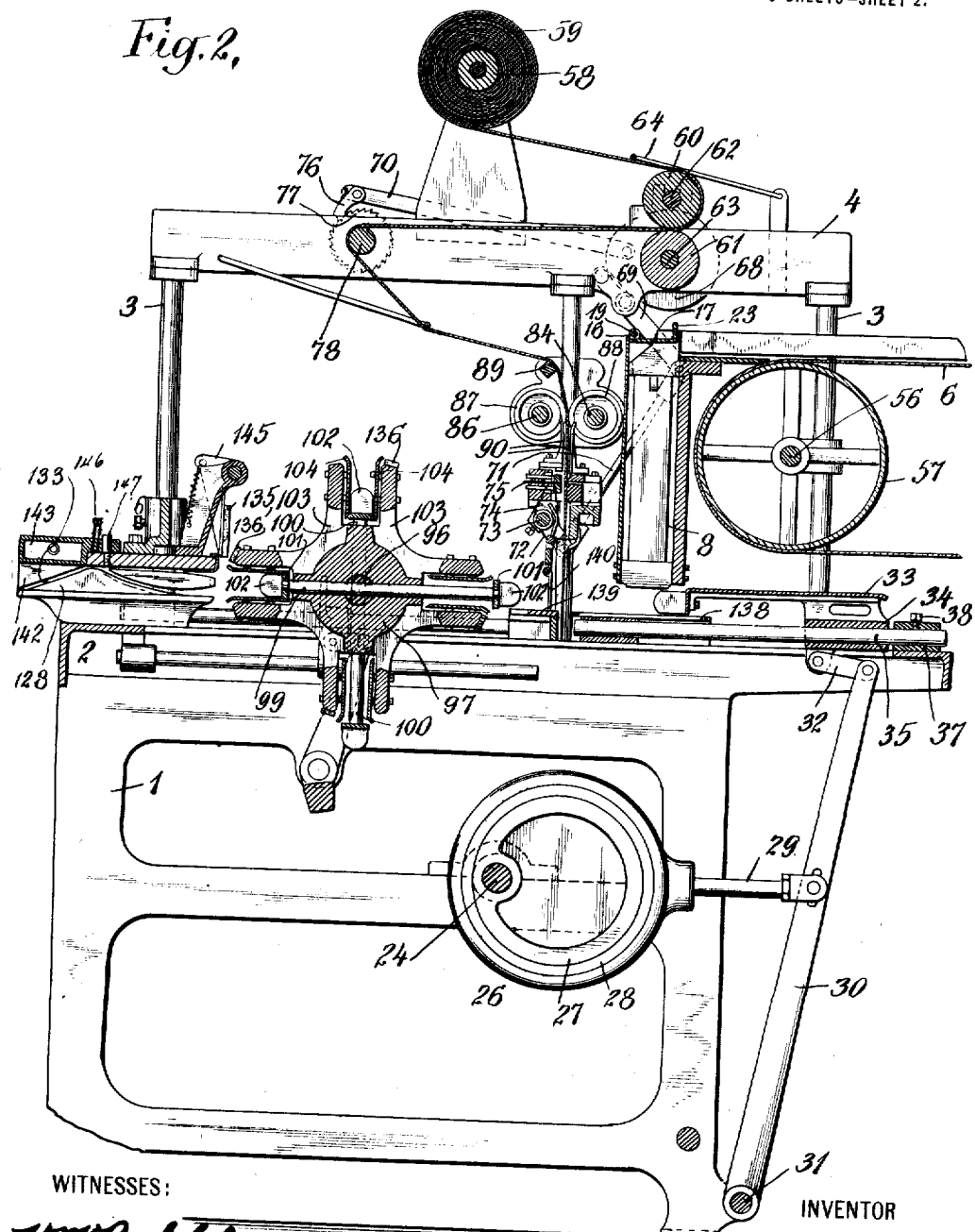
Figure 5:
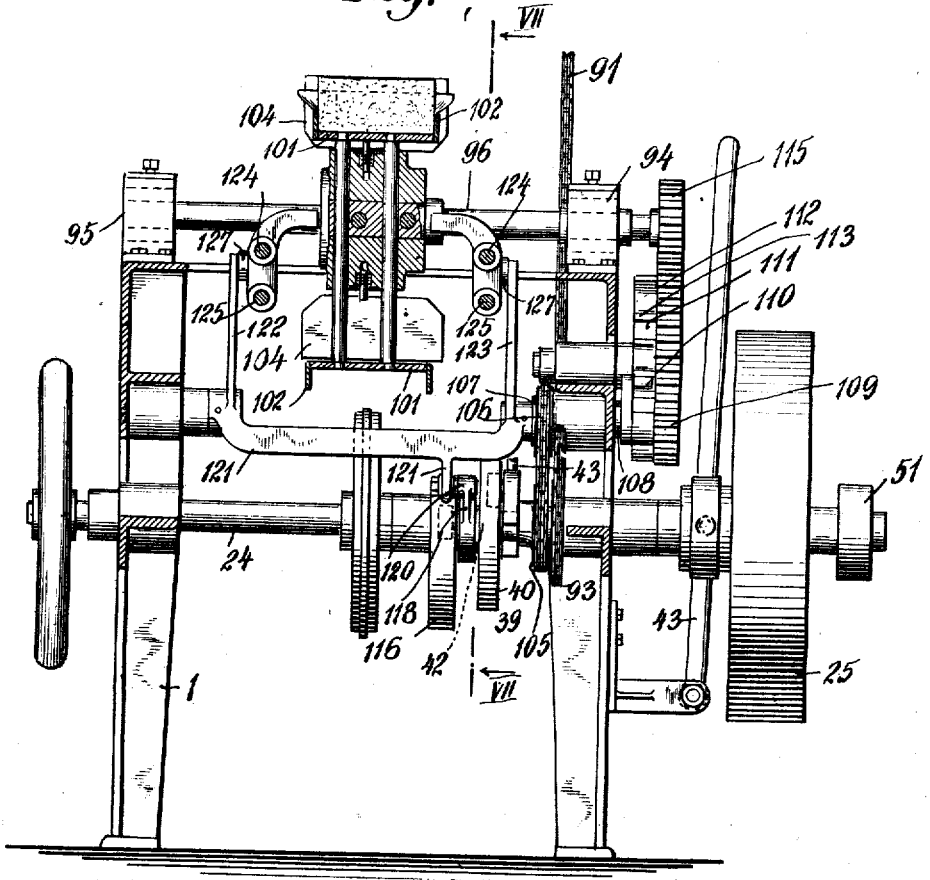
Figure 6:
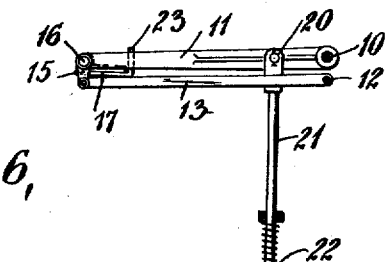

A simple and convenient embodiment of my machine thus briefly outlined is illustrated in the annexed drawings, and referring now thereto wherein like reference characters refer to the same parts in all the views, Figure 1 is a side view with parts broken away to show certain details of construction. Fig. 2 is a longitudinal section. Fig. 3 is a sectional plan view taken on the line III—III of Fig. 1. Fig. 4 is a plan view of the conveyer and the novel means accurately positioning the packages into the package chute. Fig. 5 is a transverse section of the machine taken on line V—V of Fig. 3. Fig. 6 shows my means for feeding the packages to the package chute. Fig. 7 shows in detail the tumble box for wrapping the paper around the sides of the article. Fig. 8 is a sectional plan view of parts shown in Fig. 7. Fig. 9 is a view similar to Fig. 8 with the operative parts in a different position. Fig. 10 is an enlarged view of the pusher and a portion of the tumble box, the package just entering the latter. Fig. 11 is a view similar to Fig. 10 with the package completely in the tumble box. Fig. 12 is an enlarged view of the tumble box in a diametrically opposite position from that shown in Fig. 11 and in position to transfer the package to the means for folding the flaps at the ends thereof. Fig. 13 is a similar view of Fig. 12 with the parts in different relative positions. Fig. 14 is a side view of the complete means for making the folds at the ends of the package together with a same view of the sealing means and the tumble box, the latter being shown in the act of transferring a package to the folding means. The forward package is just about to pass under the sealing device. Figs. 15 and 16 show side views of the sealing device and associated elements with the package in different positions from that shown in Fig. 14. Fig. 16 shows the package issuing from the machine. Fig. 17 is a view taken on the line $x$—$x$ of Fig. 14 looking in the direction of the arrows. Fig. 18 is a view taken on the line $y$—$y$ of Fig. 14 looking in the direction of the arrows. Fig. 19 is a view on line $z$—$z$ of Fig. 15 looking in the direction of the arrows.

Referring now to the drawings in detail the reference numeral 1 indicates a suitable frame upon which the various elements of my machine are supported. The frame 1 has a suitable top 2 clearly shown in Fig. 3. From the top 2, and from substantially the corners thereof, four standards 3, project upwardly therefrom and support a frame 4 upon which is mounted a part of the mechanism.

Reference numeral 5 indicates a suitable platform over the bottom of which passes a belt conveyer 6 the latter passing over the pulley 57. The platform 5 is provided with sides which are adapted to properly guide the packages when urged forward by the conveyer belt 6 it being understood that the packages are placed, either manually or mechanically, upon the latter. From the platform 5 the packages are fed to a package chute 8. This chute is supported vertically on the top 2 and is adapted to retain several packages. Doors 8' are provided to permit the removal of packages if needs be. It will be noted that the conveyer belt does not extend as far as the top of the receptacle but it will be understood that the packages after leaving the belt are urged along by means of the packages at the rear thereof and on the conveyer belt.

Novel means, to be described later, are provided at the bottom of the receptacle for removing the packages. The mechanism can be so arranged that the packages will be fed to the chute at the top in proportion to the rapidity with which they are removed from the bottom thereof. Should, however, the packages be fed faster to the top of the chute than they can be removed at the bottom no harm will result as novel mechanism is provided to feed them to the chute just as fast as they are taken from it. It will be observed therefore that it is well to adjust the necessary mechanism so as to feed them up to the receptacle just a little faster than they are disposed of. Projecting downwardly from the frame work 4 is a suitable support 9 to which is pivotally mounted at 10 a member 11 and just below the pivot 10 on the same support is another pivot 12 on which is mounted a member 13. These members and associated mechanism constitute what I prefer to call a "vertical pusher". The members 11 and 13 are connected at the front ends thereof to a common member 14. Passing through the member 14 and rigidly connected at 15 to arm 13 is a shaft 16 with a stop member 17 rigidly connected at 18 and 19 to said shaft 16. To the member 11 and near the pivotal point 10 is pivoted at 20 a vertically reciprocating rod 21. It will therefore be noted that when the rod 21 is pushed upwardly by means of mechanism to be described later that the bottom portion of the stop member 17 will always be in a horizontal position and adapted to press upon the entire upper surface of the package when forced down by means of the compression spring 22. It necessarily follows therefore, the part 23 of the stop being at right angles to the portion 17, that the said part 23 is always in a vertical position. The portion 23 prevents the advance of the succeeding packages while the part 17 is pressing on the upper package in the chute to force all the packages therein downwardly after the removal of the lowermost package therefrom. As soon as the member 17 is raised by means of the rod 21 it will be clear that a package will be advanced under the said member in position to enter the chute as soon as the lowermost package therein has been removed therefrom and the pusher returned to its normal position. It will thus be seen that each time the pusher operates to advance the lowermost package, the member 17 will be raised to allow a package to advance into proper position to enter the chute. The mechanism for bringing about this alternate action is about to be described.

With regard to the platform upon which the feed belt is operated as well as the feed belt itself and the chute, particular attention is called to the offsetting of the chute from the feed mechanism as clearly shown in Fig. 4. In constructing this device and all similar devices where the feed mechanism is in alinement with the chute a very serious obstacle is encountered especially in pasteboard or similar packages having flaps or similar projections at the ends thereof. Where they are in alinement the flaps on the packages which are on the platform invariably engage under the flaps on the upper package of the chute thereby causing them to become entangled and makes the feed irregular and quite frequently causing tearing of the flaps. In my device by offsetting the feed from the chute this objection is completely avoided. This is quite important not only from an efficiency but from a commercial standpoint as well.

The feeding from the conveyer to the chute is accomplished by expanding one side of the plaform 5 as shown at "a" in Fig. 4 and in providing an inclination at the upper end and on the opposite side of the chute indicated at "b", substantially parallel to the part "a". It will therefore be apparent that as the package is being fed from the conveyer to the chute, it will be moved laterally and the objection, above referred to, avoided.

To the main or driving shaft 24 of the machine is rigidly attached a driving pulley 25 connecting to some source of power. Upon this shaft is mounted an eccentric 26 (see Figs. 1, 2 and 5) having an eccentric disk 27 and usual ring 28. A stem 29 (see Fig. 2) extends rearwardly from the eccentric and engages a lever 30 pivoted at its lower end at 31 to the supporting frame 1 and pivoted at its upper end to a link 32 the latter in turn having a pivotal connection to extensions 34 of the pusher 33. The two hollow extensions 34 are adapted to receive rods 35, which guide the pusher in its reciprocatory action, and which are adapted to be received in hollow projections 36 and 37 extending upwardly from the top 2. Set screws 38 are provided in projections 36 and 37 to maintain the rods 35 in proper position and of course allows the rods, and in consequence thereof the pusher 33, to be readily removed. As shown the pusher has a forward and rearward slide on the rods 35 and as viewed in Fig. 2 it is at its rearmost position. On the shaft 24 is mounted a second eccentric 39. The construction of this eccentric is somewhat different from that of eccentric 26. The eccentric 39 comprises disk 40 having the eccentric slot 41, which is adapted to receive a projection 42 from the lever 43, the projection 42 being preferably provided with an antifriction roller. The lever 43 has a forked end adapted to engage over the shaft 24 similar to the forked lever 118 described below with reference to cam 116 and shown in Fig. 7. This lever 43 extends rearwardly and is connected at 44, with a lost motion connection, to one end of the lever 45. This lever is connected pivotally at its other end and is adapted to have an oscillating movement on this pivot. To this same pivot is connected one end of a lever 46 the other end of the same being connected to the rod 21 above described. The levers 45 and 46 are supported by the lug 47 (see Fig. 6) projecting downwardly from the top 2 of the supporting frame. On the lever 45 is a screw-threaded lug 48 adapted to receive an adjustment screw 49 which engages in the depression 50 and urges the lever 46 together with rod 21 upwardly when the eccentric lever 43 is forced forwardly by means of its eccentric disk 40. The adjusting of the screw, as will obviously be understood causes the member 17 to be raised more or less, which is quite frequently necessary. It may not be amiss to state here that the package in the chute which is next to the lowest one is prevented from taking its final position owing to the fact that it will rest on the top of the pusher, the same having a smooth flat top, as soon as the lower one has been removed. The package will drop only when the pusher has been completely retracted.

The driving shaft 24 upon which the cams 26 and 39 are mounted has also mounted thereon a pulley 51. This pulley is connected to the pulley 52 by means of a driving belt 53. Upon the shaft of the latter is rigidly mounted a pinion 54 said pinion meshing with and operating a gear 55. Gear 55 is mounted upon a shaft 56 to which is rigidly connected pulley or drum 57 or other equivalent device for operating the feed belt 6. Suitably mounted upon the frame 4 is a drum 58 upon which is wound a roll of paper or similar fabric 59, paraffined waxed or impregnated with any readily fusible material which is impervious to moisture, and such that when heated will melt and when subsequently cooled will congeal and cause the overlapping portions to adhere. This paper in passing from the drum, on which it is wound, passes over and between feed rolls or feed drums 60 and 61 (see Fig. 2) these drums being mounted on shafts 62 and 63. Mechanism 64 is provided to take up any undue slack in the paper that may exist between the drum 60 and the main drum 58.

Upon the shaft 62 is mounted a gear 65 meshing with a gear 66 located upon one end of the shaft 63, while at the other end of this shaft 63 is a cam 68 (see Fig. 2) which operates the lever 69 and the arm 70. The said lever 69 is pivoted at one end of frame 4 and when actuated by cam 68 the said lever is depressed and operates arm 71. The latter is connected to a lever 72, mounted upon a shaft 73, and when depressed the arms 74 of the said lever 72 operate a knife 75 which cuts off portions of the paper or fabric at suitable and predetermined intervals.

The construction of the knife *per se* is an old one and is a part of my invention in so far as it affects the novel structural combinations and arrangements of parts. The arm 70 referred to *supra* as being connected to the cam 68, has at the other end thereof a pawl 76 which engages a ratchet 77 mounted upon one end of a shaft 78 over which the paper is fed after leaving the drums 60 and 61. Rigidly mounted upon the other end of the shaft 78 is a sprocket wheel 79 over which a sprocket chain 80 passes, said chain passing over a companion sprocket wheel 81. An idler 82 is suitably located to take up any slack in said chain. Adjacent to the sprocket wheel 81 is a gear 83 mounted upon the same shaft 84 and operating therewith. Gear 83 meshes with gear 85 which is mounted upon a shaft 86 (see Fig. 2) the latter being rigidly connected to drum 87. Drum 88 has a rotary motion with respect to its shaft 84. Upon the ends opposite to the gears 83 and 85 are two intermeshing gears (not shown) which cause the rubber drums to revolve in synchronism. The paper or fabric after leaving drum 78 then passes rearwardly over the guide 89 and downwardly between the drums 87 and 88. From the latter the paper passes between suitable guides 90, constituting a part of the knife referred to above, and extends down substantially flush with or even below the frame 2 and in the path of the pusher 33. Over the sprocket wheel 67 is mounted a sprocket chain 91 passing over an idler 92 supported upon the framework 4, and thence over another sprocket wheel 93 which is mounted upon the driving shaft 24 and imparts motion to the feeding mechanism and the cutting means just described.

Journaled upon the top 2 at 94 and 95 is a shaft 96. Upon the latter is sleeved an enlarged portion 97 carrying buffers 98 for a purpose to be described later. A pair of rods or slides 99 pass through the center of the sleeve 97 and shaft 96 having a limited sliding motion therein. These rods are arranged at right angles to similar rods 100. Upon the ends of these pairs of rods are mounted receivers or plates 101 for the packages. Each member 101 carries two end tuckers 102 provided for the purpose of tucking against the opposite ends of the package parts of the end extensions of the wrapper. The sleeve has four pairs of arms or jaws 103 and between each pair of jaws two spring pressed plates 104 (see Fig. 7) are mounted and form with the plate 101 a pocket for the reception of a package with a wrapper partially folded about it. These plates 104 grip the package and form the sides of the pocket while the plate 101 forms the bottom of the pocket. This part which carries the pockets and is commonly termed the tumble box has such connections with the operating shaft of the machine as will give it a step by step movement, each step amounting to exactly one quarter revolution of the tumble box and the shaft 96 upon which it is mounted. This step by step movement is communicated to the tumble box by the interpositioning between the driving shaft and the shaft 96 of the common Geneva movement. Upon the driving shaft 24 just back of the sprocket wheel 93 (Fig. 1) is another sprocket wheel 105 having the sprocket chain 106, the latter passing over another sprocket wheel 107 rigidly mounted upon a short shaft 108. Upon the shaft 108 is mounted the means for giving a rotary step movement to the gear wheel 109. This means comprises a crank arm having a projection 110 on the end thereof adapted to enter grooves 111. A continuous counter-clockwise movement (Fig. 1) is imparted to the arm through the connections heretofore mentioned. The projection on the arm engaging the groove 111 each time it makes a revolution, gives a slight movement to the gear 109 upon which the grooves are cut. A groove 112 is cut in the circumference of the portions 113 defined by the aforesaid grooves, and this groove is the arc of a circle whose radius is equal to the radius of the circle of which the outer portion of the projecting lug 114 is an arc. This lug 114 therefore is so constructed that the same will engage with the groove 112 and lock the gear wheel against movement from the time the projection 110 leaves one groove 111 until it engages the next. As soon as the projection 110 engages the next groove 111 the lug ceases to lock the gear owing to the cutaway portion thereof. The gear 109 intermeshes with gear 115, the latter being so proportioned with respect to the former that a step in the Geneva movement just described gives a quarter turn to the shaft 96 upon which the tumble box is mounted.

Mechanism is provided, independent of the mechanism for rotating the tumble box and operating alternately with the latter, for ejecting the packages from the pockets of the tumble box to a receiver which completes the folding of the paper around the package, and this receiver comprises, *inter alia*, a means for finally sealing the paper to the packages. To the driving shaft is mounted a third cam 116 having the cam groove 117, (see Fig. 7), and a cam lever 118 having thereon a suitable projection 119 entering the groove 117. The lever 118 has a pin and slot connection to a projection 120 extending downwardly from a double-armed lever 121 the individual arms thereof being designated by numerals 122 and 123. (See Fig. 5.) To the top 2 and located above the same on each side of the tumble box and suitably supported are rods 124. Corresponding rods 125 are attached to the top 2 below the same and in a vertical plane with rods 124. Fingers 126 each having two eyes are slidably mounted on these rods, said fingers being connected to the arms 122 and 123 by means of links 127. These fingers are adapted to engage behind the package holders and urge them forward out of the pockets into the receiver, this forward movement of the holders being permitted because they are mounted on the rods 99 which have a limited sliding movement relative to their supports, namely, the shaft 96 and sleeve 97.

With reference to Fig. 14 the reference numeral 128 designates what I have chosen to call a receiver or folding chute. It is unnecessary to state that the inner dimensions of this receiver are substantially the same as the package fed to it. A horizontal slit 129 (Figs. 7, 12, 13), open where the package enters the receiver is adapted to receive the upper flap 130 of the wrapper. Another slit 131 inclined upwardly is adapted to receive the flap 132. It will be noted that the slit 129 being horizontal simply affords a passage for the upper flap 130; but owing to the incline to slit 131 the lower flap 132 will be neatly folded against the end of the package. Just beyond the point where slot 132 joins slot 129 the latter turns downwardly. The flap 130 proceeding downwardly in this slit 133 is folded against the package but over the flap 132. Upon the receiver is suitably mounted a standard 134. Upon this standard is pivoted a bell crank arm 145. On that part of the arm which projects downwardly, and on the front side thereof, is a facing of friction material 135, such as leather which coöperates with a like facing 136 on one of the jaws of the pockets, to take out any wrinkles in the last lap of the paper, the part 135 being urged against the material 136 by means of a spring 137 connected to a portion at substantially right angles to the downwardly projecting portion. The spring is properly tensioned for the purpose.

Having described the machine in detail as briefly as the structure permits the operation of the same and different steps in wrapping the packages is as follows: motion in the direction of the arrow, being communicated to the drive wheel 25 mounted upon the driving shaft 24 from any suitable source of power, will be transmitted, by cams 26, 40 and 116, by sprocket wheels 93 and 105, and by pulley 51 to the divers parts of the machine. The motion of the pulley 51 is transmitted by means of the belt 53 to pulley 52. The motion of this last mentioned pulley is in turn transmitted to the pulleys 57 by means of the pinion 54 and gear 55. Upon the pulley or drum 57 the feed belt 6 is mounted, another similar pulley, not shown, being arranged at the other end of the support board 5 over which said belt operates. The packages are fed onto the belt one after the other by any suitable means, manually or mechanically. These packages are conveyed by the belt to the chute 8 but it will be noted that the belt does not extend entirely up to the receptacle, the packages being delivered from the belt to a smooth platform 5' from whence they are urged by the force of the succeeding packages into position to enter the package chute 8 which as clearly described in connection with Fig. 4 is offset somewhat from the feeding mechanism. In the position of the parts shown in Fig. 1 the pusher 33 is just in the act of removing the lowermost package from the receptacle 8 the said package resting upon a raised portion 138, the part 139 while being separated slightly therefrom for an obvious purpose, is nothing more than a continuation of the portion 138. This removal is effected by means of the cam 26 lever 29 directly connected to said cam, lever 30 and link 32, the latter being connected to the tubular extension 34 which is integral with the pusher. Simultaneous with the forward movement of the lever 29, or nearly so, is the rearward movement of the lever 43 connected to lever 45, the latter being connected with the member 11 through the rod 21 and lever 46. This rearward movement, therefore, of the lever 43 raises the member 11 and its associated mechanism just high enough to allow a package to enter the package chute, it being understood that the forward part of the package chute at this point projects high enough to form a stop in order to arrest further horizontal movement of the foremost package. The cam is so constructed that the member is held in its upper position thereby for a certain and definite duration of time when the same is allowed, through the member 17, to press by means of the spring 22 upon the uppermost package to insure the downward travel of all the packages in the chute.

It will be observed that the cam does not pull the member downward owing to the lost motion connection between the levers 45 and 46. While the pusher is urging the package lowermost in the chute from the latter to the tumble box, the cam 68 simultaneously begins to oscillate upon the lever 69 to bring the knife into action for cutting off a predetermined length of the wrapping paper which has been previously fed in the path of the package, the lever 69 being connected to said knife through rod 71 and lever 72 mounted upon shaft 73. The length of the wrapper depends upon the gears used and also upon the height of the knife.

The paper is fed, of course, at intervals and the operation of this feed mechanism is as follows: Power is communicated to the sprocket wheel 67 by means of the sprocket chain 91 and sprocket wheel 93 the latter, as stated above being rigidly connected to and operated by the driving shaft 24. The rotary motion of the sprocket gear 67 converts, by means of the cam 68 and also by means of the arm and pawl 70, 76, the ratchet gear 77 into a step by step movement. Ratchet gear 77 being mounted upon one end of the shaft 78, the latter has a similar movement. Upon the opposite end of the shaft is mounted a sprocket wheel 79 whose ratio to the ratchet wheel is about 2 to 1. Over the sprocket wheel 79 is run a sprocket chain to another sprocket gear 81 having a ratio of about 1 to 2 to gear 79. Gear 81 is mounted adjacent to gear 83 which has a ratio to the former of about 3 to 1. It will therefore be observed that as reciprocatory motion is imparted to the arm 70 and pawl 76 a slight rotation of the ratchet gear 77, owing to the ratio of the respective gears, a substantial rotation is given to the gear 85. The ratio should be such that at each step a quantity of paper will be fed the length which will be substantially the distance between the knife and the frame. The strip of paper being fed in front of the package as just described, the pusher in advancing it to the tumble box will cause the front side of the package to engage the paper and carry the same along. About the time the paper is engaged by the package the cutting action takes place. Inasmuch as the paper projects downwardly between the portions 138 and 139 substantially one half of the lower side of the package will be covered with the paper or fabric (see Figs. 7, 10, and 11). For the sake of convenience this side will be called, the first side, the rear portion, the second side, and so on. A swinging portion 140 is mounted to stretch and guide the paper wrapper as the package carries it into the tumble box. When the package is finally positioned between the resilient plates 104 on the jaws, the wrapper will be folded about three sides of the package. Also the projecting ends of the wrapper on the second side will be tucked against the end of the package by means of the end cutters 102 at the ends of the member 101. When the package is pushed forwardly to the extent shown in Fig. 11 the pusher is retracted and the package is transferred by the Geneva movement, which is one form of step by step movement, through ninety degrees when the operation is repeated. The second package is then transferred through ninety degrees and the first package has now passed through one hundred and eighty degrees. The first package is now ready to be transferred from the tumble box to the receiver. It may be mentioned that the fourth side of the package is covered by the wrapper as it comes into contact with the member 135 on the bell crank arm 145. The lower, or first side of the package is now the upper, and the front has assumed the rear and vice versa. The remaining portion of the wrapper is projecting upwardly and is gently pinched between the members 135 and 136 so that it is stretched tightly over the package. Now it is evident that when this comes into contact with the upper end of the receiver the same will be forced down upon the first side and will overlap somewhat the part of the wrapper already on that side. At the same time that this portion is being forced down on the first side the projecting ends of the third side are forced against the ends of the package by means of the tuckers 141 of the receiver. The end tuckers 102 at opposite ends of the plate 101 which forms the bottom of the pocket in the tumble box hold the first pair of end tucks in their folded positions while the package is being ejected from the tumble box into the folding chute or receiver, as indicated in Figs. 7, 8 and 9, so that these tucks are always under control of some tucking or folding device and have no opportunity to move out of their folded positions.

The method of folding the upper and lower flaps 130 and 132 has been set forth above and further elucidation seems quite unnecessary. It may be added however that the part 142 which folds down the flap 130 is a part of the sealing means comprising a steam chamber 143 and with an inlet pipe 144 and an outlet pipe 144'. The part 142 therefore is heated by the steam sufficiently to melt the wax which subsequently congeals and seals the wrapper. The post 147 allows the said sealing means to be positioned clear of the package. It may also be stated that the pusher 33 has nothing to do with the reciprocation of the rods 99 upon which the members 101 are mounted; at least if the pusher does move either pair it is simply accidental as they are moved positively by the fingers 126 and associated mechanism. Of course the pusher starts on its forward movement simultaneously with the fingers.

The operation of the various parts and mechanisms having been explained it seems unnecessary to further probe into details. Suffice to say that practical use of the invention, as embodied in the apparatus illustrated herein, has demonstrated its effectiveness for the purpose sought.

The invention is particularly useful for sealing articles which are to be protected from bacterial contamination, for example toilet and surgical soap, and especially packages and cartons containing cereal foods which depend largely upon a condition of crispness for their palatability, though the invention is of course in no way limited to the purposes just mentioned. Nor is the invention limited to the precise form and arrangement of parts herein specifically described, being capable of embodiment in various forms without departure from its proper scope as defined by the appended claims.

What I claim is:

1. In a wrapping machine, the combination of a package chute, means for feeding a series of packages to said chute, each package pushing the one in advance of it into the chute, said chute being offset with relation to said means and said means including a guideway for the packages having a diagonal portion adjacent to said chute whereby each package is moved out of alinement with the others in the guideway as it is pushed into said chute.

2. In a wrapping machine, the combination of a package chute and means for guiding packages to said chute, said means and chute being laterally offset with relation to each other whereby each package must be moved into a laterally offset position with relation to its companions as it is moved into said chute.

3. In an apparatus for wrapping and sealing packages, the combination of a conveyer, a package chute for receiving the packages from the conveyer, a vertical pusher associated with the conveyer and package chute for properly feeding the packages to and through the package chute comprising a bracket, a pusher lever pivoted to said bracket, a member below said lever, similar thereto and pivoted also to said bracket, means connecting the lever and member together, means associated with the last mentioned means in such way as to always be in a horizontal direction for pressing upon the entire upper surface of the uppermost package in the chute, and means for raising the vertical pusher.

4. In a wrapping machine, the combination of a conveyer for packages, a package chute positioned adjacent to the end of said conveyer, said chute being offset with relation to the conveyer, and a diagonal guideway between the conveyer and chute through which the packages are pushed in an offset relationship to each other as they are carried into said chute.

5. In a wrapping machine, a tumble box having a pocket constructed to receive a package with a wrapper partially folded about it, a plate forming a movable bottom for said tumble box, a slide supporting said plate and mounted to reciprocate in the tumble box to enable the plate to be moved in the direction of the depth of the pocket and two end tuckers carried by said plate.

6. In a wrapping machine, the combination with a tumble box having a pocket constructed to receive a package with a wrapper partially folded about it, of tuckers positioned at the opposite ends of said pocket and operative to tuck the wrapper over the ends of a package in said pocket, a folding chute, and means for moving the packages one at a time from said tumble box into said chute, said chute having stationary folders operative to make all the other folds necessary to complete the wrapping of the ends of the package.

7. In a wrapping machine, the combination of a tumble box having diametrically opposed pockets each constructed to receive a package with a wrapper partially folded about it, a slide carried by the tumble box, a plate mounted on each end of said slide, said plates forming the bottoms of the respective pockets, and two end tuckers carried by each of said plates.

8. In a wrapping machine, the combination of a tumble box having pockets each constructed to receive a package with a wrapper partially folded about it and with a wrapper flap extending out of the tumble box, a receiver, means for pushing the packages from the pockets of the tumble box into the receiver one at a time, and means cooperating with a member carried by the tumble box to pinch said flap yieldingly while the package is being pushed out of the tumble box into said receiver.

9. In a wrapping machine, the combination of a tumble box having pockets each constructed to receive a package with a wrapper partially folded about it, and with a wrapper flap extending out of the tumble box, a receiver, means for pushing the packages from the pockets of the tumble box into the receiver one at a time, and a yieldingly supported member 135 cooperating with a part of the tumble box to pinch said flap and stretch it while the package is being pushed out of the tumble box into said receiver.

10. In an apparatus of the class described, a tumble box, means for conveying packages to said tumble box, means on said tumble box for completely wrapping two sides of the package and a part of the third side, means also on said tumble box for folding the projecting ends of one side down upon the ends of the package, and means coöperating with the tumble box for wrapping the fourth side.

11. In an apparatus of the class described, a tumble box, means for conveying packages to the tumble box, means on said tumble box for completely wrapping two sides of the package and a part of a third side, means on said tumble box for folding the projecting ends of one side down upon the ends of the package, means coöperating with the tumble box for wrapping the fourth side, a receiver or folder, means for transferring the packages from the tumble box to the receiver or folder, and means to complete the wrapping of the third side while the package is being transferred from the tumble box to the folder.

12. In an apparatus of the class described, a tumble box, means for conveying packages to the tumble box, means on said tumble box for completely wrapping two sides of the packages and a part of a third side, means also on said tumble box for folding the projecting ends of one side down upon the ends of the package, means coöperating with the tumble box for wrapping the fourth side, a receiver or folder, means for transferring the packages from the tumble box to the receiver or folder, and means to complete the wrapping of the third side and to fold the projecting ends of the wrapper of the side opposite to the folded ends above mentioned down upon the ends of the package while the package is being transferred from the tumble box to the folder.

13. In an apparatus of the class described, a tumble box, means for conveying packages to the tumble box, means on said tumble box for completely wrapping two sides of the packages and a part of a third side, means also on said tumble box for folding the projecting ends of one side down upon the ends of the package, means coöperating with the tumble box for wrapping the fourth side, a receiver or folder, means for transferring the packages from the tumble box to the receiver or folder, means to complete the wrapping of the third side and to fold the projecting ends of the wrapper of the side opposite to the folded ends above mentioned down upon the ends of the package while the package is being transferred from the tumble box to the folder, means on said folder to complete the folding of the wrapper upon the ends of the package, and means also thereon for sealing said wrapper.

14. In an apparatus of the class described, a tumble box, means for conveying packages to the tumble box, means on said tumble box for completely wrapping two sides of the packages and a part of a third side, means also on said tumble box for folding the projecting ends of one side down upon the ends of the package, means coöperating with the tumble box for wrapping the fourth side, a receiver or folder, means for transferring the packages from the tumble box to the receiver or folder, means to complete the wrapping of the third side, and to fold the projecting ends of the wrapper of the side opposite to the folded ends above mentioned down upon the ends of the package while the package is being transferred from the tumble box to the folder thereby forming an upper and a lower fold projecting from the ends of the package, means on said folder for folding the lower fold upwardly, and a sealing means on said folder adapted to simultaneously fold the upper fold downwardly and to seal the wrapper upon the package.

15. In an apparatus of the class described, in combination, a tumble box, means for conveying packages to the tumble box, means associated with said tumble box for wrapping the paper around the package and partly folding the projecting ends of the wrapper, a receiver or folder to complete the folding of the projecting ends of the wrapper, means for transferring the packages from the tumble box to the folder, a sealing means on said folder, and a vertical adjusting means for said sealing means.

16. In an apparatus of the class described, in combination, a tumble box, means for conveying packages to the tumble box, means associated with said tumble box for wrapping the paper around the package and partly folding the projecting ends of the wrapper, a receiver or folder to complete the folding of the projecting ends of the wrapper, means for transferring the packages from the tumble box to the folder, a sealing means on said folder, a vertical adjusting means for said sealing means and means for allowing the sealing means to be raised out of contact with the packages should the machine be stopped for any reason.

17. In an apparatus for wrapping and sealing packages, a tumble box, means for conveying packages to the tumble box, a receiver or folder, means for conveying the packages from the tumble box to the folder, means on the tumble box and folder for wrapping and folding the wrapper upon the package, and a heat sealing means on said folder adapted to be raised and lowered at will.

18. In a wrapping machine, the combination of a conveyer, a package chute positioned adjacent to the end of said conveyer and arranged to receive packages from the conveyer, a pair of parallel arms movable about stationary pivots, links connecting the free ends of said arms, a pusher supported by said links having a part operative to push the packages into the chute and another part serving as a stop for the packages moved toward said chute by the conveyer, and means for raising and lowering said arms.

19. In a machine for wrapping and sealing packages in a wrapper containing a readily fusible substance, a folding chute comprising a member having a heating chamber, said member being positioned to engage the top of a package moved through said chute and having parts positioned to engage the ends of the package whereby the heat of said member will melt said substance in the overlapping flaps at the top and ends of the package.

20. In a machine for wrapping and sealing packages in a wrapper containing a readily fusible substance, a folding chute comprising a member having a heating chamber therein, and parts projecting from said member constructed to make the last fold on the ends of a package pushed through said chute whereby the heat of said member will melt said substance in the overlapping flaps at the top and ends of the package.

21. In an apparatus for wrapping and sealing packages in a wrapper containing a readily fusible substance, a receiver or folder for said packages comprising a heat sealing means having a chamber therein through which a heating fluid is adapted to circulate to seal the top of the package and means on said heat sealing means projecting downwardly therefrom for making the last fold on the ends of the package and for sealing the same, said heat sealing means being adapted to be vertically adjusted out of contact with said package.

22. In a machine for wrapping and sealing packages in a wrapper containing a readily fusible substance, a folding chute including folders operative to make the last fold at each end of a package, and means for heating said folders to cause them to fuse the substance in the overlapping wrapper flaps at the opposite ends of the package and thereby seal said flaps together.

In testimony whereof I affix my signature in the presence of two subscribing witnesses.

MILFORD B. FERGUSON.

Witnesses:
 WM. BOHLEBER,
 M. LAWSON DYER.

ages moved toward said chute by the conveyer, and means for raising and lowering said arms.

19. In a machine for wrapping and sealing packages in a wrapper containing a readily fusible substance, a folding chute comprising a member having a heating chamber, said member being positioned to engage the top of a package moved through said chute and having parts positioned to engage the ends of the package whereby the heat of said member will melt said substance in the overlapping flaps at the top and ends of the package.

20. In a machine for wrapping and sealing packages in a wrapper containing a readily fusible substance, a folding chute comprising a member having a heating chamber therein, and parts projecting from said member constructed to make the last fold on the ends of a package pushed through said chute whereby the heat of said member will melt said substance in the overlapping flaps at the top and ends of the package.

21. In an apparatus for wrapping and sealing packages in a wrapper containing a readily fusible substance, a receiver or folder for said packages comprising a heat sealing means having a chamber therein through which a heating fluid is adapted to circulate to seal the top of the package and means on said heat sealing means projecting downwardly therefrom for making the last fold on the ends of the package and for sealing the same, said heat sealing means being adapted to be vertically adjusted out of contact with said package.

22. In a machine for wrapping and sealing packages in a wrapper containing a readily fusible substance, a folding chute including folders operative to make the last fold at each end of a package, and means for heating said folders to cause them to fuse the substance in the overlapping wrapper flaps at the opposite ends of the package and thereby seal said flaps together.

In testimony whereof I affix my signature in the presence of two subscribing witnesses.

MILFORD B. FERGUSON.

Witnesses:
WM. BOHLEBER,
M. LAWSON DYER.

---

Correction in Letters Patent No. 1,187,055.

It is hereby certified that in Letters Patent No. 1,187,055, granted June 13, 1916, upon the application of Milford B. Ferguson, of Brooklyn, New York, for an improvement in "Wrapping and Sealing Machines," an error appears in the printed specification requiring correction as follows: Page 6, line 119, after the period insert the sentence *The sealing means is adjustable upwardly and downwardly by set screw 146.;* and that the said Letters Patent should be read with this correction therein that the same may conform to the record of the case in the Patent Office.

Signed and sealed this 25th day of July, A. D., 1916.

[SEAL.]

F. W. H. CLAY,
*Acting Commissioner of Patents.*

Cl. 93—7.

Correction in Letters Patent No. 1,187,055.

It is hereby certified that in Letters Patent No. 1,187,055, granted June 13, 1916, upon the application of Milford B. Ferguson, of Brooklyn, New York, for an improvement in "Wrapping and Sealing Machines," an error appears in the printed specification requiring correction as follows: Page 6, line 119, after the period insert the sentence *The sealing means is adjustable upwardly and downwardly by set screw 146.;* and that the said Letters Patent should be read with this correction therein that the same may conform to the record of the case in the Patent Office.

Signed and sealed this 25th day of July, A. D., 1916.

[SEAL.]

F. W. H. CLAY,

*Acting Commissioner of Patents.*

Cl. 93—7.